US009832685B2

(12) United States Patent
Tamaki et al.

(10) Patent No.: US 9,832,685 B2
(45) Date of Patent: *Nov. 28, 2017

(54) APPARATUS AND METHODS FOR GROUP WIRELESS TRANSMIT/RECEIVE UNIT (WTRU) HANDOVER

(71) Applicant: InterDigital Patent Holdings, Inc., Wilmington, DE (US)

(72) Inventors: Nobuyuki Tamaki, Melville, NY (US); Pouriya Sadeghi, San Deigo, CA (US); Janet A. Stern-Berkowitz, Little Neck, NY (US); Christopher R. Cave, Dollard-des-Ormeaux (CA); Stephen E. Terry, Northport, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/665,570

(22) Filed: Mar. 23, 2015

(65) Prior Publication Data

US 2015/0201353 A1 Jul. 16, 2015

Related U.S. Application Data

(63) Continuation of application No. 13/478,456, filed on May 23, 2012, now Pat. No. 8,989,741.

(Continued)

(51) Int. Cl.
*H04W 36/00* (2009.01)
*H04W 72/12* (2009.01)

(52) U.S. Cl.
CPC .... *H04W 36/0016* (2013.01); *H04W 36/0011* (2013.01); *H04W 72/121* (2013.01); *H04W 36/0027* (2013.01)

(58) Field of Classification Search
CPC ..... H04W 4/08; H04W 84/12; H04W 72/042; H04W 4/005; H04W 4/06; H04W 72/121
See application file for complete search history.

(56) References Cited

U.S. PATENT DOCUMENTS 8,555,063 B2 * 10/2013 Xiao .................... H04L 63/105
713/168
2007/0076670 A1 * 4/2007 Kuchibhotla ......... H04L 5/0053
370/336

(Continued)

FOREIGN PATENT DOCUMENTS

CN 101835224 A 9/2010
JP 2011-097154 5/2011

(Continued)

OTHER PUBLICATIONS

CMCC, "Requirements for supporting high speed train scenario in LTE," 3GPP TSG-RAN WG3 #71, R3-110656 (Feb. 21-25, 2011).

(Continued)

*Primary Examiner* — Nam Huynh
(74) *Attorney, Agent, or Firm* — Volpe and Koenig, P.C.

(57) ABSTRACT

Apparatus and methods of handing over a wireless transmit/receive unit (WTRU) that belongs to a group of WTRUs from an originating base station to a target base station are described. A method includes the WTRU obtaining information regarding a group to which the WTRU has been assigned and the WTRU receiving at least one of handover reconfiguration information that is common to the group and handover reconfiguration information that is specific to the WTRU. On a condition that the WTRU receives the handover reconfiguration information that is specific to the WTRU, the WTRU initiates a synchronization procedure with the target base station based at least on the received handover reconfiguration information.

8 Claims, 8 Drawing Sheets

Related U.S. Application Data

(60) Provisional application No. 61/489,054, filed on May 23, 2011.

(56) References Cited

U.S. PATENT DOCUMENTS

| | | | |
|---|---|---|---|
| 2009/0247150 A1 | 10/2009 | Fischer et al. | |
| 2009/0325578 A1 | 12/2009 | Li et al. | |
| 2010/0144354 A1 | 6/2010 | Ho et al. | |
| 2012/0003962 A1 | 1/2012 | Jeon et al. | |
| 2012/0231797 A1 | 9/2012 | Van Phan et al. | |
| 2014/0016494 A1* | 1/2014 | Van Phan | H04W 16/14 370/252 |

FOREIGN PATENT DOCUMENTS

| | | |
|---|---|---|
| WO | WO 2011/059300 A2 * | 5/2011 |
| WO | 2011123755 A1 | 10/2011 |

OTHER PUBLICATIONS

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.7.0 (Mar. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.3.0 (Mar. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.1.0 (Mar. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.7.0 (Mar. 2012).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).

Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.13.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.6.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.10.0 (Mar. 2012).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.1.0 (Mar. 2011).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.5.0 (Mar. 2012).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.1.0 (Mar. 2011).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.1.0 (Mar. 2011).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.4.0 (Dec. 2011).

Interdigital Communications, "Mobile Relays Scenarios and Issues," 3GPP TSG-RAN WG3 Meeting #73-bis, R3-112483, Zhuhai, China, (Oct. 10-14, 2011).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.1.0 (Mar. 2011).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.5.0 (Mar. 2012).

Third Generation Partnership Project, "Technical Specification Group Radio Access Network; Evolved Universal Terrestrial Radio Access (E-UTRA); Physical layer procedures (Release 10)," 3GPP TS 36.213 V10.1.0 (Mar. 2011).

Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012).

* cited by examiner

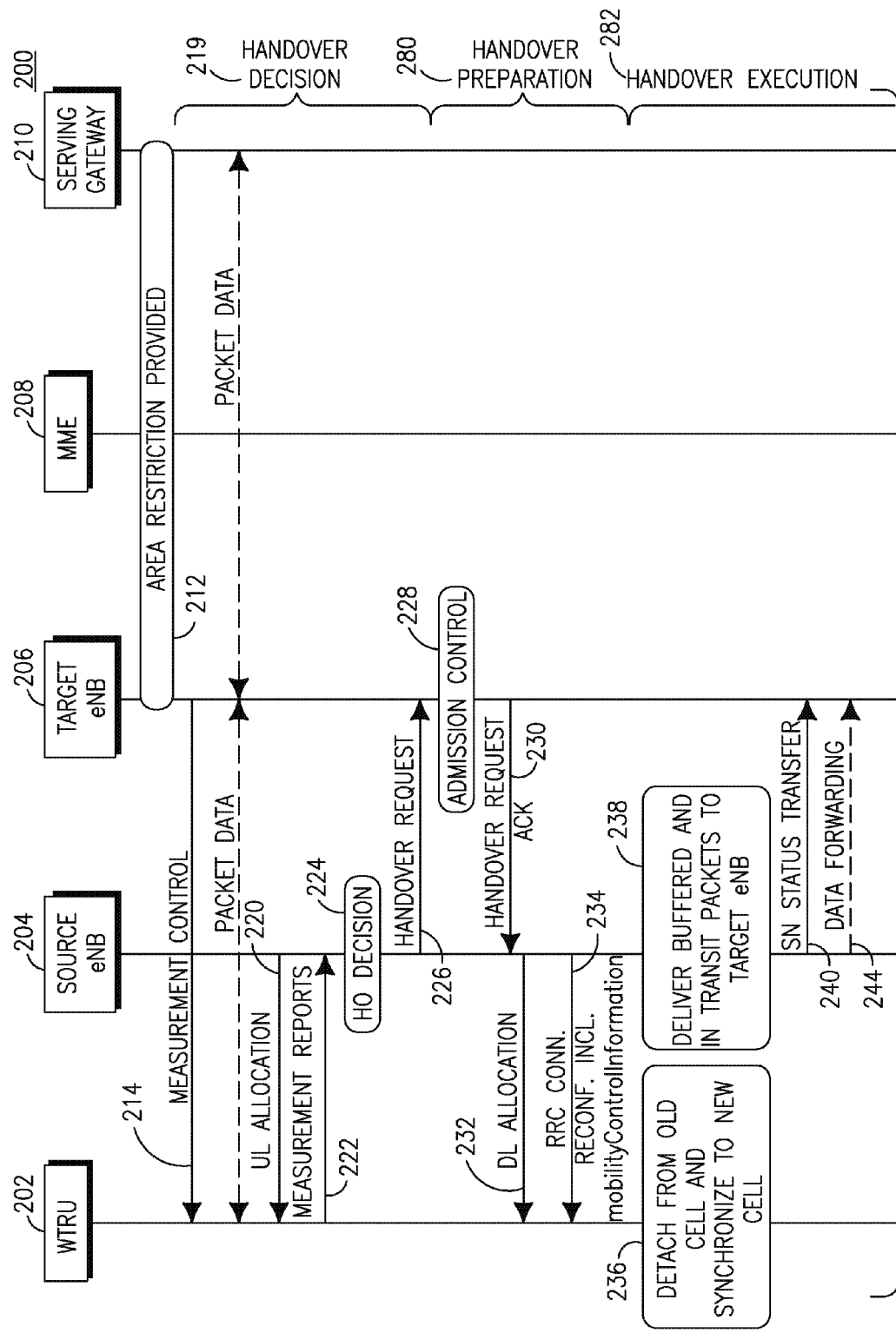
FIG. 2A CONTINUED ON FIG. 2B

APPARATUS AND METHODS FOR GROUP WIRELESS TRANSMIT/RECEIVE UNIT (WTRU) HANDOVER

CROSS REFERENCE TO RELATED APPLICATIONS

This application is a continuation of U.S. patent application Ser. No. 13/478,456, filed May 23, 2012, which claims the benefit of U.S. Provisional Application No. 61/489,054, which was filed on May 23, 2011, all of which are incorporated by reference herein.

BACKGROUND

To support mobility of connected mode wireless transmit/receive units (WTRUs) within a wireless network (e.g., a long term evolution (LTE) network), wireless networks provide for handover of individual WTRUs from one cell of the network to another cell of the network. For example, if a person is using his or her cell phone and travels far enough from a base station to which his or her cell phone is connected, the cell phone may be handed over to another cell to maintain a quality cell phone connection. Such a handover may be network-initiated and WTRU-assisted. In other words, the decision to hand a WTRU over from one cell to another cell (e.g., within an Evolved Universal Mobile Telecommunications System (UMTS) Terrestrial Radio Access Network (E-UTRAN)) may be made by a source base station (e.g., eNode-B (eNB)) that is currently servicing the WTRU, and the source eNB may make the decision based on measurement reports provided by the WTRU and other network aspects (e.g., traffic load). Once the source eNB has decided to hand the WTRU over to another cell associated with a target eNB, it may initiate a handover procedure to hand the WTRU over to the target eNB.

SUMMARY

Apparatus and methods of handing over a wireless transmit/receive unit (WTRU) that belongs to a group of WTRUs from an originating base station to a target base station are described. A method includes the WTRU obtaining information regarding a group to which the WTRU has been assigned and the WTRU receiving at least one of handover reconfiguration information that is common to the group and handover reconfiguration information that is specific to the WTRU. On a condition that the WTRU receives the handover reconfiguration information that is specific to the WTRU, the WTRU initiates a synchronization procedure with the target base station based at least on the received handover reconfiguration information.

BRIEF DESCRIPTION OF THE DRAWINGS

A more detailed understanding may be had from the following description, given by way of example in conjunction with the accompanying drawings wherein:

FIGS. 2A and 2B are diagrams of an example X2 handover sequence;

DETAILED DESCRIPTION

Figure 1A:
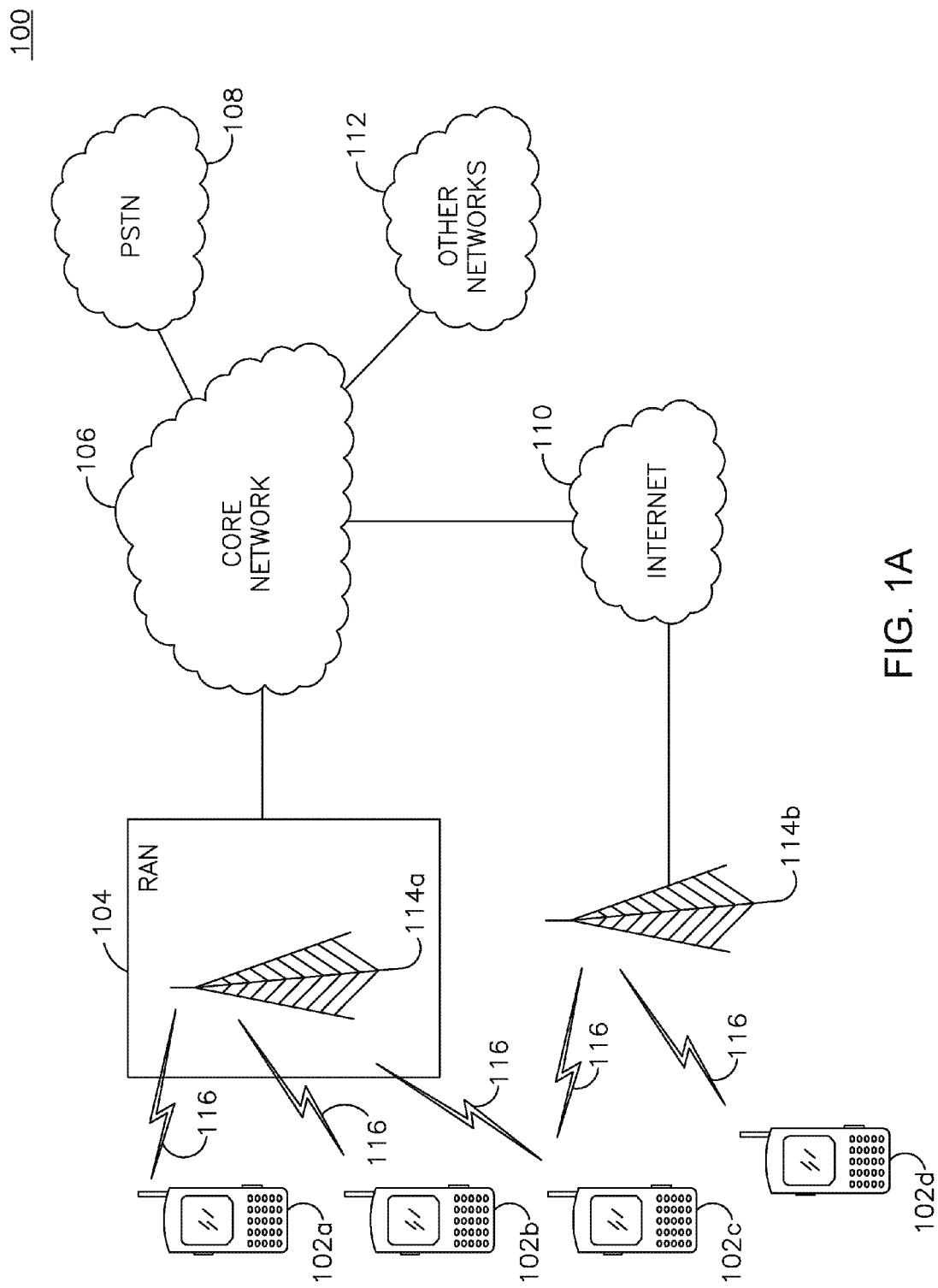
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
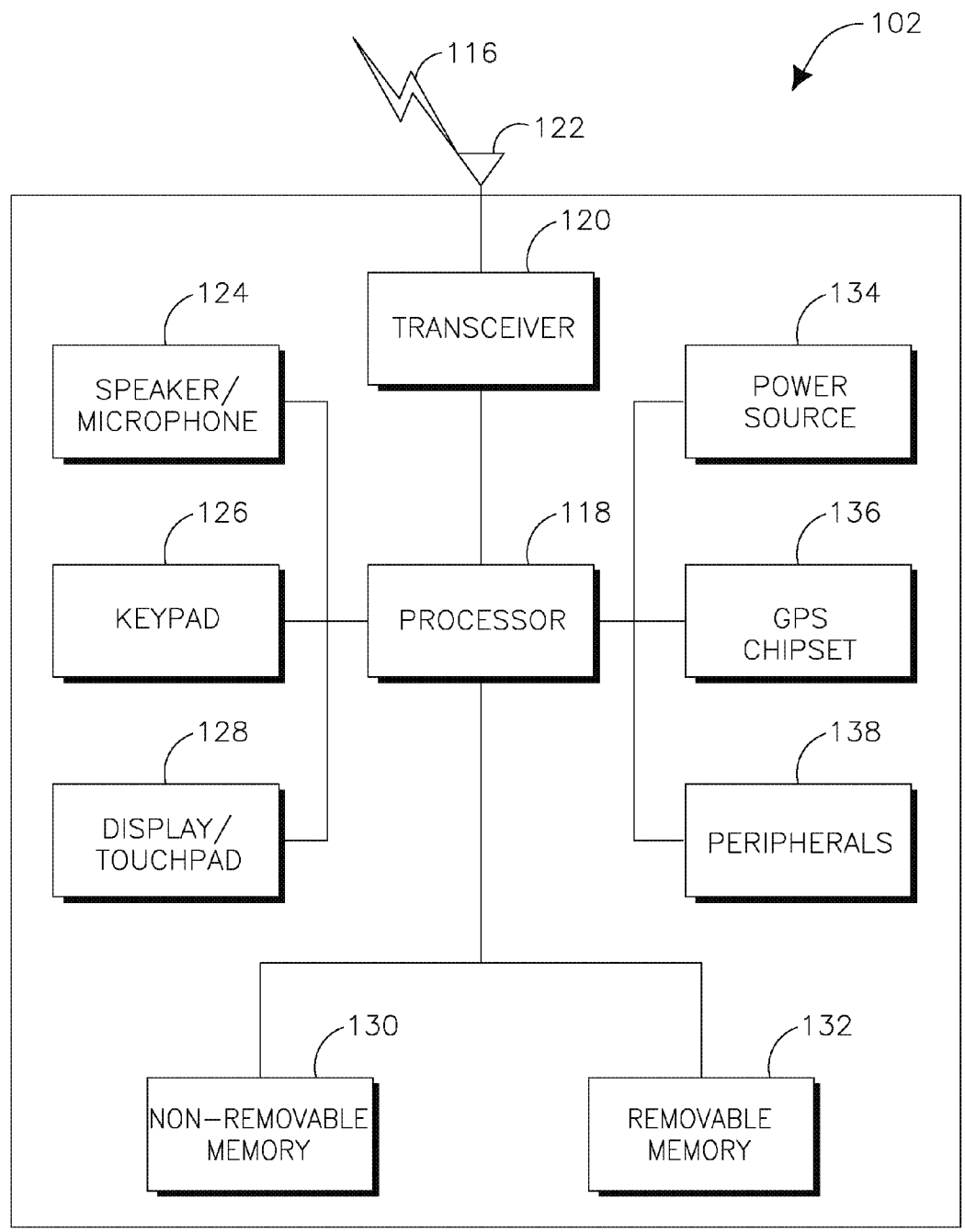
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
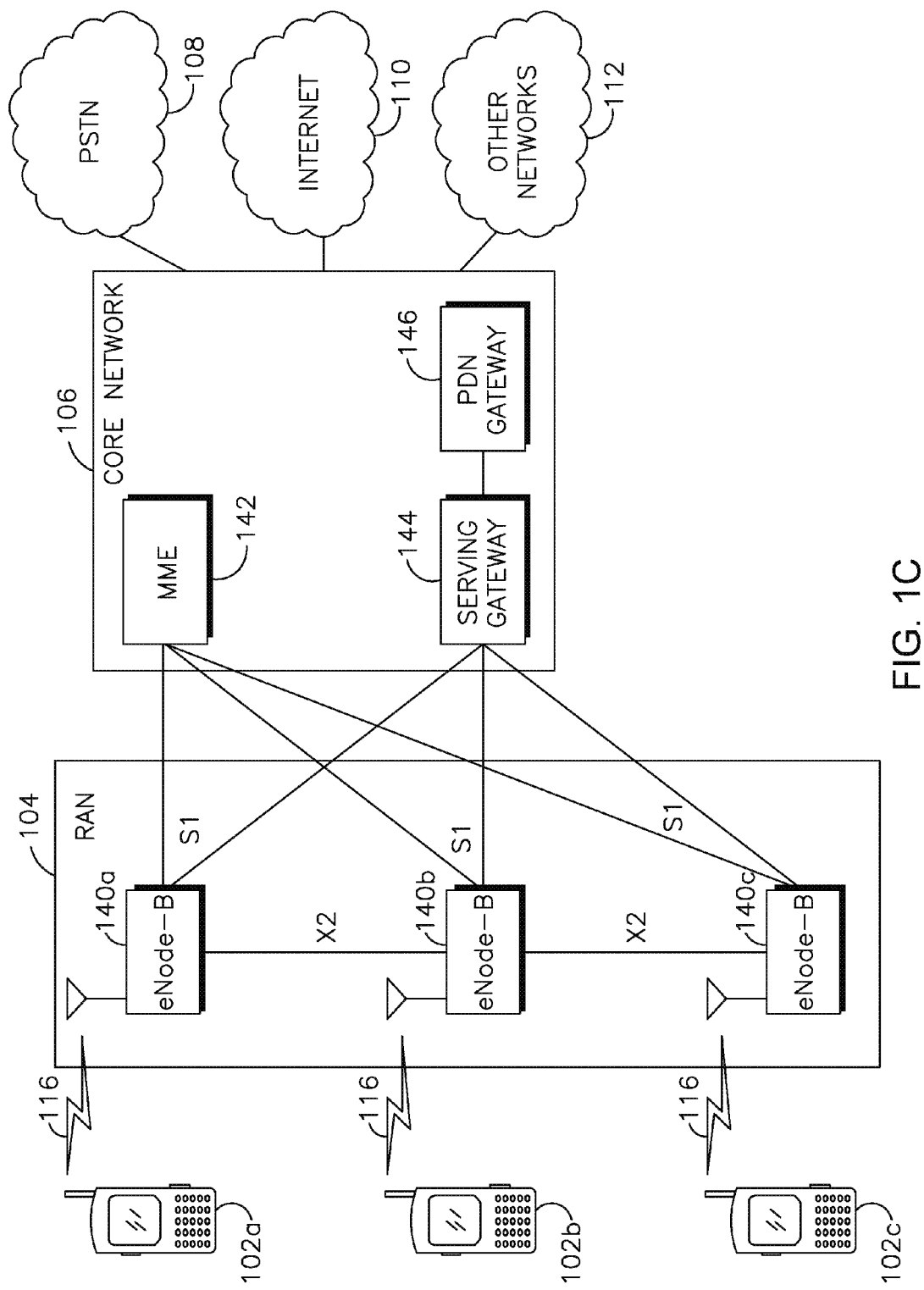
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Procedures for handover of individual WTRUs from one cell to another (e.g., where a person is talking on his or her cellular telephone in a car and begins to lose connectivity to the base station to which the cellular telephone is currently connected) may not be efficient or affective where a number of WTRUs share the same mobility pattern (e.g., where a group of people are talking on their cellular telephones on a high speed train that may reach a velocity of 500 km/hour or more). For example, in the group handover scenario, a large number of WTRUs may need to make and send measurements to the same eNB at the same time, unnecessarily overloading the eNB with multiple instances of the same or similar reports while using up limited uplink resources. For another example, if the reports indicate that a better cell is available for each of the WTRUs in the group, the eNB may need to initiate handover procedures for each individual WTRU in the group at the same time, resulting in excessive signaling on the air interface between the source eNB and the WTRUs and on the interfaces among the network nodes (e.g., the X2 interface) as the source eNB prepares to individually hand over each of the WTRUs. Accordingly, use of individual WTRU handover procedures to hand over a group of WTRUs that have similar mobility patterns may result in an undesirably or prohibitively large amount of signaling overhead and insufficient resources to support it, which may ultimately result in dropped or reduced quality calls for users of such WTRUs.

Apparatus and methods are provided herein that may reduce signaling overhead on eNB air and other interfaces related to handover of a number of WTRUs with a similar mobility pattern and/or manage P(RACH) resources in an environment where the need for a large number of such resources may be bursty.

In an embodiment, WTRUs may be grouped, and the group and/or group-related information may be indicated only to one or a subset of the WTRUs in the group.

In an embodiment, measurements may be reported to an eNB on a group basis. For example, one of a subset of the WTRUs in a group may be appointed to make and report measurements on behalf of the group. Other WTRUs in the group may report individual measurements (e.g., in response to new event or measurement criteria) only on a condition that the measurement differs from a value by a predetermined amount (e.g., a representative measurement for a group of WTRUs). The group-based reporting may, for example, reduce signaling and enable the eNB to know when a WTRU has left the group. Individual measurement reports may be suspended and/or resumed, for example, to reduce unnecessary measurement reporting.

In an embodiment, an eNB may make handover preparations on a group-basis. For example, a source eNB may send an indication of multiple WTRU handover to a target eNB, which may include an added message to prepare the target eNB for an influx of WTRUs, for example, to improve the chances of successful admission of all of the WTRUs. Consolidation of handover preparation information for a group of WTRUs may, for example, enable efficient signaling between source and target eNBs (e.g., on the X2 interface) and from the source eNB to the WTRUs (e.g., over the Uu interface).

In an embodiment, RACH/PRACH resources may be managed. For example, an eNB may assign additional temporary resources to support bursty influx of a large number of WTRUs without the need to unnecessarily over-provision the PRACH resources when there is not such a large need. For another example, a group RACH procedure may be performed where only a subset of the WTRUs may initiate the RACH process and the rest of the WTRUs in the group may rely on the configuration parameters from the RACH process initiated by the subset. Accordingly, the RACH processes may be skipped or minimized by the rest of the WTRUs in the group, which may save PRACH resources.

In an embodiment, messages related to WTRUs belonging to a group may be bundled into one message on other interfaces in the network.

In an embodiment, early handover preparation may be performed, which may include making pre-handover measurements, synchronization and access (e.g., broadcast reception and RACH).

A source eNB may initiate a handover procedure (from a control plane perspective) and forward incoming data that has not yet been delivered to the WTRU to the target eNB for eventual delivery to the WTRU (from a user plane perspective) using an X2 or S1 interface. From the control plane perspective, a handover procedure may be initiated using an X2-application part (AP) if an X2 connection exists between the source and target eNB, there is no change in the evolved packet core (EPC) node (mobility management entity (MME) and/or serving gateway (GW)) due to handover of the WTRU, and the source eNB has not received a negative reply from the target eNB for an attempted X2 handover. Otherwise, the handover procedure is initiated via the S1-AP toward the MME. The resources required to support the moving WTRU at the target eNB may be prepared prior to notifying the WTRU of the handover. From the user plane perspective, in order to minimize data loss while the WTRU moves from the source to target cells, the source eNB may establish an X2 or S1 tunnel to forward the incoming data that has yet to be delivered to the WTRU to the target eNB. This may continue until the WTRU has synchronized with the target eNB on the target cell, and the data path to/from the serving GW has been switched.

Figure 2B:
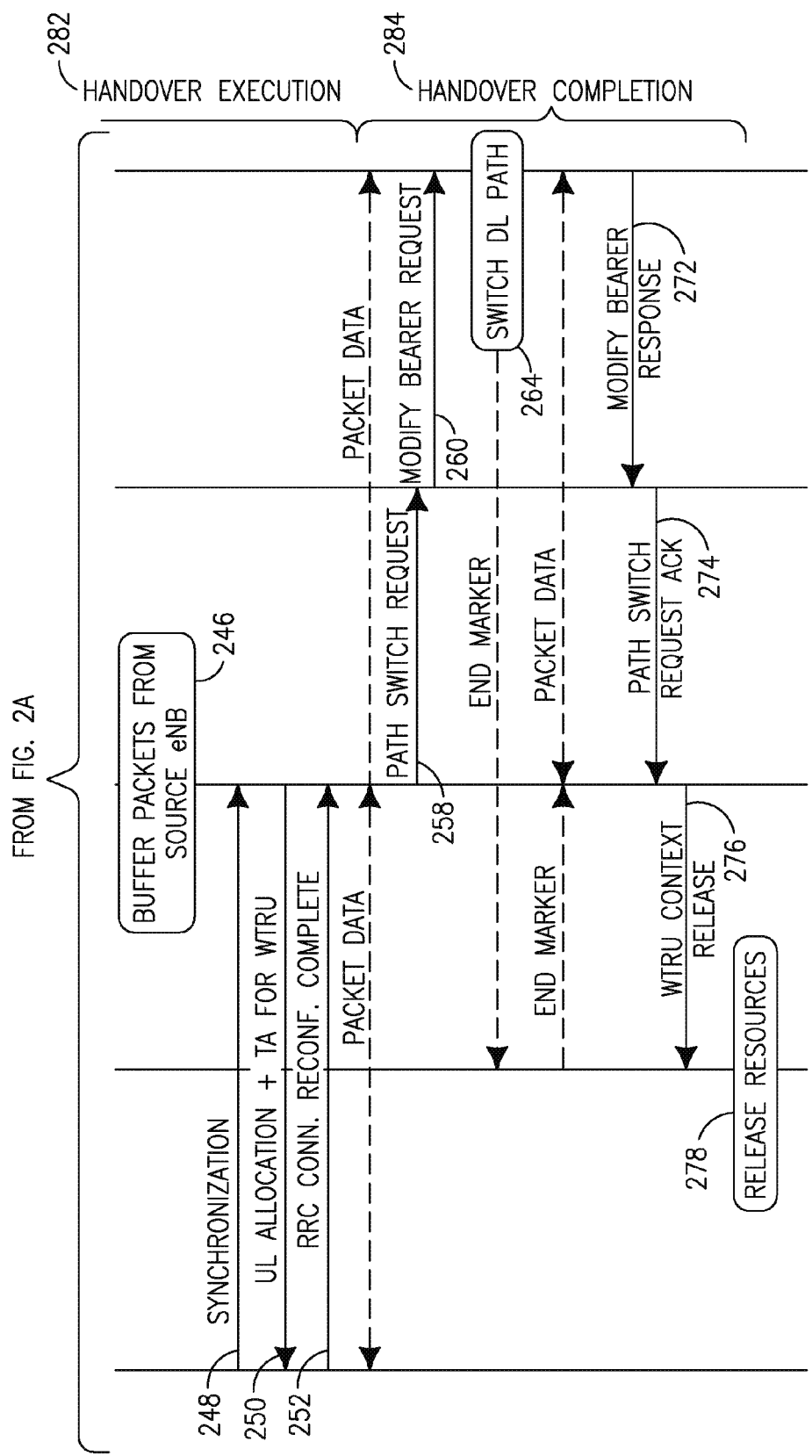

FIG. 2 is a diagram of an example X2 handover sequence that involves no MME or S-GW change. The illustrated handover sequence has a number of different phases, including a handover decision phase 219, a handover preparation phase 280, a handover execution phase 282, and a handover completion phase 284. Initially, area restriction is provided amongst a source eNB 204, a target eNB 206, an MME 208 and a serving GW 210 (212).

During the handover decision phase 219, the source eNB 204 may decide to hand the WTRU 202 over to the target eNB 206 based on at least one of measurement reports from a WTRU 202, load conditions, and other criteria. The source eNB 204 may send a measurement control message 214 and an uplink (UL) allocation 220 to the WTRU 202. In response to receiving the measurement control message 214, the WTRU may measure ambient conditions (e.g., quality of service (QoS)) and provide corresponding measurement reports 222 to the source eNB 204 using the UL allocation 220. The source eNB 204 may use the measurement reports 222 to decide whether to hand over the WTRU 202 to another eNB (e.g., the target eNB 206) (224).

During the handover preparation phase 280, the source eNB 204 and target eNB 206 may prepare for the handover of the WTRU 202 by transferring information between them. The source eNB 204 may send a handover request message 226 to the target eNB 206, which may include WTRU-specific information. The WTRU-specific information may include, for example, information regarding the WTRU's active E-UTRAN radio access bearers (E-RABs). The target eNB 206 may then perform admission control for the WTRU 202 (228) and send a handover request acknowledgement message 230 to the source eNB 204, which may include information to enable the WTRU 202 to synchronize with the new cell and resume E-RAB services. Having received this information from the target eNB 206, the source eNB 204 may provide a downlink allocation (232) to the WTRU 202 along with the information to enable the WTRU 202 to synchronize with the target eNB (234).

During the handover execution phase 282, the WTRU 202 may attempt to synchronize with the target eNB 206 by means of a RACH procedure and may complete the radio resource control (RRC) reconfiguration procedure. The WTRU 202 may detach from the old cell and synchronize with the new cell (236). During this phase, the source eNB 204 may deliver buffered and in transit packets to the target eNB 206 (238), including, for example, sending an SN status transfer message 240 to the target eNB 206 and data forwarding (244). Upon receipt of the buffered packets from the source eNB 204, the target eNB 206 may buffer the packets (246). The WTRU may initiate a synchronization procedure with the target eNB 206 (248), and the target eNB 206 may send a UL allocation to the WTRU 202 (250). The WTRU 202 may use the allocated UL resources to send a reconfiguration complete message 252 to the target eNB 206.

During the handover completion phase 284, the source and target eNB, along with the EPC, may switch the data path from the source eNB 204 to target eNB 206, and the source eNB 204 may release any resources allocated for the WTRU 202. In the example illustrated in FIG. 2, the target eNB 206 sends a path switch request 258 to the MME 208, and, in response, the MME 208 sends a modify bearer request message 260 to the serving GW 210. The serving GW 210 may switch the DL path accordingly (264) and send a modify bearer response message 272 to the MME 208. In response, the MME 208 may send a path switch request acknowledgement 274 to the target eNB 206, which may send a WTRU context release message 276 to the source eNB 204. The source eNB 204 may release the resources (278).

S1 handover may be similar to the X2 procedure described above but may also include the MME 208 in the handover preparation phase 280. In particular, the interaction between the source eNB 204 and the WTRU 202, and subsequently the target eNB 206 and the WTRU 202, may remain the same in the S1 handover procedure as in the X2 handover procedure.

As part of the handover execution phase 282, the WTRU 202 synchronizes with and accesses the target eNB 206 (this may be the first time the WTRU communicates with the target cell and informs it of its presence). The WTRU 202 may use a RACH procedure to obtain RACH/PRACH resources for communication with the target eNB at least during the handover execution phase 282. RACH may be used since it may be difficult for the target cell to assign resources to a WTRU handing over when it does not know exactly when the WTRU will synchronize and begin downlink (DL) reception/UL transmission. RACH may also be used to allow the target cell to determine the correct timing advance for the WTRU 202. The WTRU 202 may use one or a contention-based RACH procedure and a contention-free RACH procedure, as described in more detail below.

Figure 3:
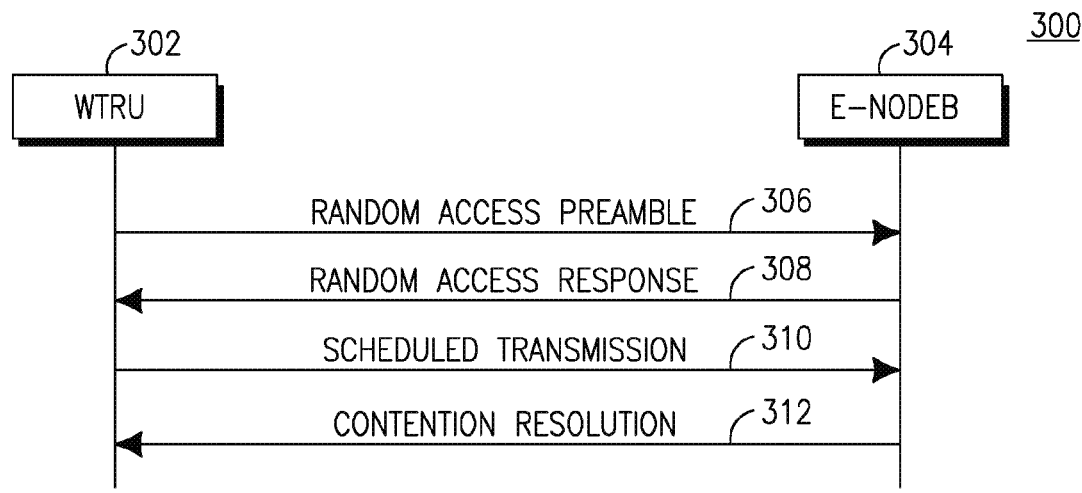
FIG. 3 is a diagram of an example contention-based RACH procedure.

FIG. 3 is a diagram of an example contention-based RACH procedure 300. In the illustrated contention-based RACH procedure 300, a WTRU 302 transmits a random access-preamble 306 to an eNB 304. The eNB 304 may respond to the WTRU 302 by transmitting a timing advance and a possible uplink grant (e.g., via a random access response message 308). The WTRU 302 may transmit its own identity to the network using the specified grant (e.g., scheduled transmission 310). The eNB 304 may transmit a contention-resolution message 312 to the eNB 304 and confirm the setup.

The transmission of the random access preamble 306 to the eNB 304 may occur in a dedicated physical channel referred to as a physical random access channel (PRACH). This portion of the RACH procedure may be the only portion that uses a dedicated physical resource. There may be 64 different preambles available for each PRACH resource.

Figure 4:
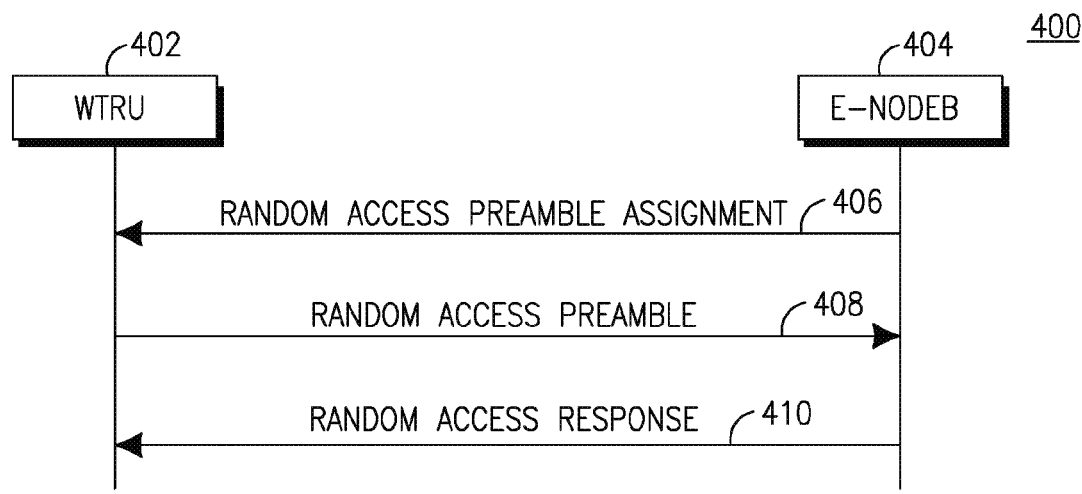
FIG. 4 is a diagram of an example contention-free RACH procedure.

FIG. 4 is a diagram of an example contention-free RACH procedure 400. In the contention-free RACH procedure 400, the preamble may be explicitly signaled by an eNB 404 to a WTRU 402 (406). In this example, the RACH procedure may be referred to as contention-free since no other WTRU will use the same preamble at the same time and, therefore, there is no potential contention (and no contention resolution step). As in the contention-based RACH procedure 300, in the contention-free RACH procedure 400, the WTRU 402 may send a random access preamble 408 to the eNB 404 and receive a random access response 410 back from the eNB 404.

There may be, for example, at most one PRACH resource per subframe. The number of PRACH resources may be configured, for example, from 1 to 20 in a 20 ms time frame. The PRACH resource configuration, (e.g., the indices of the subframes with PRACH resources) may be broadcast by the eNB 404 so all WTRUs may use such resources to initiate random access process.

Allocating insufficient bandwidth resources to a PRACH may increase the failure rate of WTRU handover and/or arrival, and allocating excessive bandwidth may decrease the throughput of the network. A goal in PRACH resource configuration may be to use as little PRACH resources as possible to statistically satisfy a nominal failure rate of WTRU handovers and/or arrivals.

Examples of parameters involved in the RACH configuration may be as follows. Parameters included in a PRACH-Configuration structure (e.g., provided in SIB 2 or dedicated signaling) may include a PRACH-ConfigurationIndex (range: 0 . . . 63) and a PRACH-Frequency Offset (range: 0 . . . 104). The PRACH-ConfigurationIndex may indicate the preamble format used in the cell (e.g., PRACH structure with respect to the duration of the cyclic prefix and the preamble sequence) and the PRACH time domain resource allocation. There may be five random access preamble formats. Four (format 0, 2, 3 and 4) of those five formats may be valid for frequency domain duplexing (FDD). Depending on the specific format, a preamble may occupy 1, 2 or 3 consecutive subframes (e.g., the preamble duration may range between 1 ms to 3 ms). The different formats may be designed to address different cell size requirements (e.g., the network may signal shorter preambles for smaller cells and longer preambles for larger cells). The PRACH-FrequencyOffset parameter may indicate the first physical resource block allocated to the PRACH opportunity (e.g., the frequency domain resource allocation).

Parameters transmitted in the IE RACH-ConfigCommon (e.g., provided in SIB 2 or dedicated signaling) may include a number of (contention-based) random access preambles (numberOfRA-Preambles) and size of Random Access preamble group-A (sizeOfRA-PreamblesGroupA). From these 2 parameters, it may be determined which preambles are in group A (e.g., contention based use) and group B (e.g., contention based and used for longer messages than group A), and which are for non-contention based use. From the set of 64 preambles, group A may include the preambles 0 to sizeOfRA-PreamblesGroupA-1. Group B may exist if numberOfRA_Preambles>sizeOfRA-PreamblesGroupA and then group B may include the preambles sizeOfRA-PreamblesGroupA to numberOfRA-Preambles-1. The preambles in the random access dedicated preamble group that can be individually signaled to the WTRUs in support of the contention-free RACH access may be the preambles numberOfRA-Preambles to 63. The total number of preambles available in group A, group B and the dedicated set may be 64.

The RACH-ConfigDedicated structure (e.g., provided in dedicated signaling only) may include the ra-PreambleIndex (range: 0 . . . 63), which may be the dedicated random access preamble to be used, and ra-PRACH-MaskIndex (range: 0 . . . 15), which may indicate in which subset of the PRACH resources the WTRU may transmit the preamble (e.g., where the full set of resources was already defined by the prach-ConfigurationIndex).

As described above with respect to FIG. 2, a handover decision phase 219 for a single WTRU may include a serving or source eNB deciding to hand over a WTRU to a target eNB based on a least one of measurement reports from the WTRU, load conditions and other criteria. However, when a plurality of WTRUs are located in proximity to one another and are moving together rapidly, bursts of measurement reports from a large number of WTRUs may be frequently sent to the same eNB (e.g., to report change of best cell as they move from one service cell to another (e.g., on a high speed train). In this scenario, reports from each of the WTRUs will likely include similar values. Thus, to make a handover decision, the source eNB may only need a report from one or a subset of the group of WTRUs.

In an embodiment, the serving eNB may configure one or a subset of a group of WTRUs to report their measurements individually and may configure the rest of the WTRUs in the group to report their measurements only on certain conditions to reduce signaling overload. For example, non-selected WTRUs may be configured to send measurement reports to the eNB only when their measurement values differ from the representative values of the group by more than a threshold or when their measurement values are outside a range from the representative values of the group. In an embodiment, this selective reporting may also indicate to the eNB that the WTRU is no longer in reasonable proximity of the other WTRUs in the group and, therefore, should be removed from the group (e.g., when the user departs the train).

In an embodiment, non-selected WTRUs may be configured to send a measurement report and/or other report or indication when the WTRU measures one or more values (e.g., at least one of reference signal received power (RSRP) for one or more neighbor cells and reference signal received quality (RSRQ) for one or more neighbor cells) and one or more condition is present. Example conditions may include: at least one measured value differs by more than a threshold from a specific value, at least one measured value differs by more than a threshold from one or more of a set of specific values, at least one measured value is outside a range around a specific value, at least one measured value is outside a range around one or more specific values and at least one measured value is outside a range of values.

In an embodiment, the specific value, set of specific values and/or range of values may be signaled to the WTRU. Further, the specific value, set of specific values and/or range of values may include at least one of: a representative measured value for a group of one or more WTRUs, a value signaled to the WTRU in a dedicated message, a value signaled to the WTRU in group signaling (which may be signaling intended for a group of one or more WTRUs), a value signaled in a radio resource control (RRC) signaling message intended for a group of WTRUs, a set of representative values, and a range of values (e.g., high and low values).

On a condition that the WTRU measures one or more values and the one or more condition is present, the WTRU may send a report (e.g., to the source eNB) that includes at least one of: the measured value that the WTRU compared with the specific value, an indication that there is a difference in the values, the difference between the measured value and the specific value, and a response for more than one measurement (which may include one or more of the above values). The measured value used for comparison and/or reported may be an individual measurement or an averaged or filtered measurement.

The WTRU configuration for reporting measurements may include an indication that the trigger for sending a measurement report for a particular measurement is a particular event or reporting condition, typical configuration parameters (which may include the measurement type (e.g., RSRP, RSRQ) and/or the parameters of the cell to be measured such as cell ID) and one or more thresholds or ranges to be used for the comparison. Alternatively, or in addition, the WTRU may receive a configuration to send a measurement report in response to an event or reporting condition, which may include at least one of an indication of the measurement or measurements for which the reporting trigger applies, an indication (e.g., the cell ID) of the neighbor cell or cells for which the WTRU should determine if the event or reporting criteria has been met and one or more thresholds or ranges to be used for the comparison.

The comparison parameters (e.g., one or more thresholds or ranges) may be the same for all measurements to which the reporting trigger applies. In this case, the WTRU may receive the parameters once for all such measurements instead of receiving separate parameters for each measurement or event/reporting criteria set-up. For example, the WTRU may be configured to report neighbor cell measurements for a set of N neighbors, and the WTRU may only report those measurements if the "exceeding representative value by threshold" or "outside representative value range" criteria is met.

Upon receipt of one or more representative values from the eNB corresponding to one or more neighbor cells, the WTRU may compare its corresponding neighbor cell measurements with those received. If the difference between any of its measured values and the received values exceeds a threshold or is outside a designated range, the WTRU may send a measurement report, which may include the values of the measurements. The reported values may represent a range of values and not be exact values such that the measurements may be reported in a fixed number of bits. In response to receiving a report from a WTRU that its measurement(s) differ from the group, the eNB may remove the WTRU from the group.

In an embodiment, the eNB may be configured to quickly select which WTRUs should report measurements and which ones should not without having to reconfigure the measurements. In an embodiment, selected WTRUs may report their measurements only on a condition that measurement reporting is not suspended. In an embodiment, reporting of measurements may be suspended or resumed on an individual or group basis.

If a WTRU receives one or more measurement configurations, at least one of the following may apply: a WTRU may make measurements according to received configuration(s) and/or other existing rules until reconfigured or instructed to suspend measurements, a WTRU may make measurements according to received configuration(s) and/or other existing rules until reconfigured independent of whether measurement reports are suspended, a WTRU may report configured measurements according to events or other reporting criteria identified for or related to the measurements, such as periodic reports or event triggered reports such as change of best cell unless the reports are suspended, a WTRU may receive an indication to suspend reporting measurements and the WTRU may receive an indication to resume reporting measurements. A WTRU may receive an indication to suspend reporting measurements, for example, on an individual basis or on a group basis (such as with a group RNTI that certain WTRUs may be configured to look for). In addition, this may be done for a specific set of one or more reportable measurements or for all reportable measurements (e.g., by identifying those measurements by their measurement ID). In response, the WTRU may suspend measurement reports accordingly. Signaling to the WTRU for resumption of reporting may be to a specific WTRU or a group of WTRUs. The resumption may pertain to a specific set of one or more configured reportable measurements or to all configured reportable measurements (e.g., by identifying those measurements by their measurement ID). In response, the WTRU may resume measurement reports accordingly.

An indication to suspend/resume measurement reports may be received by the WTRU via one or more of the following: physical layer signaling, PDCCH (e.g., as part of a DCI format), RRC signaling or a MAC control elements. RRC signaling may include a new message or signaling added to an existing message. The RRC signaling may also include a bit added to a message (such as a message that configures or reconfigures measurement reporting).

As described above with respect to FIG. 2, a handover preparation phase 280 for a single WTRU may include a source eNB indicating to a target eNB that a WTRU needs to be handed over and providing information for admission control to the target eNB. However, when multiple eNBs need to be handed over simultaneously, the target eNB may not be able to properly admit and allocate resources for all of the WTRUs if it receives a handover request from each WTRU sequentially (e.g., it may allocate resources generously for each individual incoming WTRU such that there may not be enough resources for later WTRUs in the incoming set).

Figure 5:
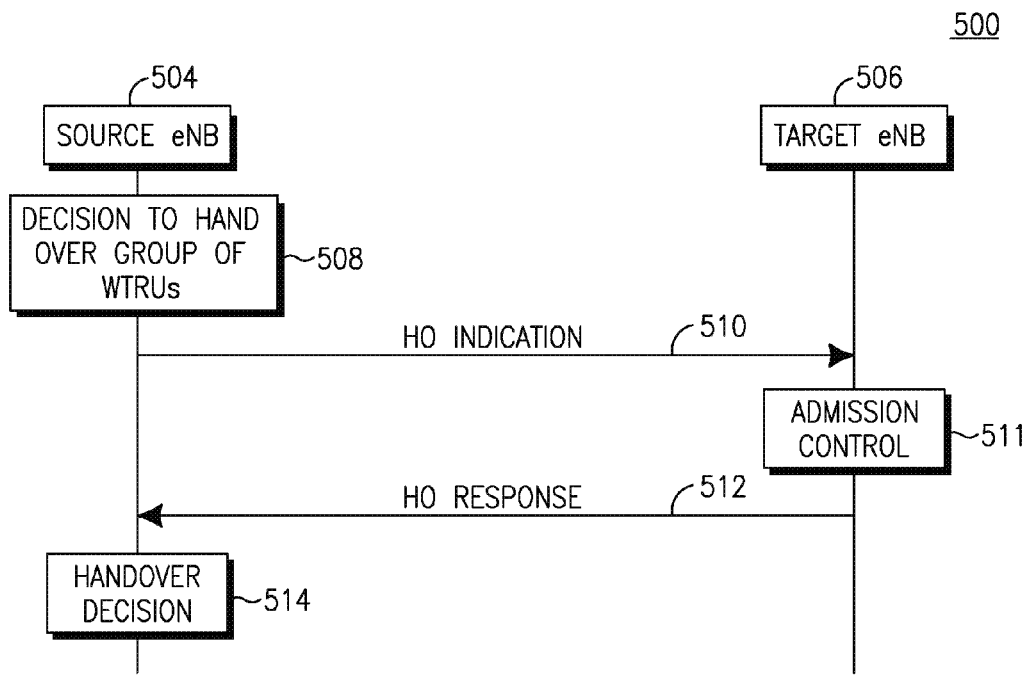
FIG. 5 is a signal diagram of an example group handover preparation phase of an X2 handover procedure.

FIG. 5 is a signal diagram 500 of an example group handover preparation phase of an X2 handover procedure. In the example illustrated in FIG. 5, a source eNB 504 may decide to hand over a group of WTRUs (508). Upon its decision to hand over the group of WTRUs to a target eNB 506, the source eNB 504 may send a handover indication message 510 to the target eNB 506, which may allow the target eNB 506 to prepare and allocate resources for the incoming WTRUs. The handover indication message 510 may provide information about the WTRUs that the source eNB has decided to hand over to the target eNB 506. The information may include, for example, one or more of a group identifier assigned to the group of WTRUs (e.g., group ID or RNTI). The information may also include the number of WTRUs in the group. The information may also include the number of E-RABs that are active for the group of WTRUs. The information may also include a load indication for the WTRU group (e.g., in terms of total PBR usage, IP throughput or other layer 2 measurements available. The information may also include additional signaling regarding PRACH resources and a summary of information regarding the E-RABs that are active for the WTRUs in the group. The summary of information may provide, for example, aggregate information for at least one characteristic. The at least one characteristic may include, for example, QCI, total aggregate GBR in case of GBR bearers, and total aggregated AMBR for non-GBR bearers. For example, the handover indication 510 may include the total number of WTRUs that are part of the group handover and/or some information about the E-RAB bearers. The information about the E-RAB bearers may include one or more of a total number of E-RABs that are allocated to the group of WTRUs, a total number of GBR bearers that are allocated to the group of WTRUs, a total aggregated GBR that may be allocated to the group of WTRUs, a total number of non-GBR bearers that may be allocated to the group of WTRUs, a total AGBR of all WTRUs in the group of WTRUs and statistical information regarding a number of bearers allocated for each available QCI (e.g., number of E-RAB bearers with QCI of 1-9).

In response to receiving the handover indication 510, the target eNB 506 may perform admission control (511). The handover indication 510 may allow the target eNB to properly allocate its available resources to all the WTRUs, compared, for example, to receiving the handover requests individually for each WTRU from the source eNB. In an embodiment, the target eNB may be configured to admit more WTRUs with reduced E-RAB service rather than providing admission to the first few WTRUs with full E-RAB service and rejecting subsequent incoming WTRUs entirely.

After performing admission control 511, the target eNB 506 may send a handover response message 512 to the source eNB 504. The handover response message 512 may include one or more indications. The one or more indications may include, for example, an indication of full success indicating that the handover of the group of WTRUs is accepted wholly and/or an indication of partial success indicating that not all WTRUs in the group are accepted (including the number of WTRUs that may not be accepted for admission into the target eNB). The one or more indications may also include, for example, an indication of partial success indicating that not all WTRUs in the group are accepted (which may include information to enable the source eNB to determine which WTRUs may be handed over. The one or more indications may also include, for example, an indication of full failure indicating that none of the WTRU are accepted to the target eNB and/or additional signaling regarding PRACH resources (described in more detail below). The one or more indications may also include, for example, an indication of time in which the number of WTRUs may be accepted (e.g., for PRACH resource allocation purposes). The indication of full success may include the case where all WTRUs are accepted by the eNB, but not all E-RABs are accepted. The indication of partial success may include information to enable the source eNB to determine which WTRUs may be handed over. This information may include, for example, load information for one or more of target eNB, the number of E-RABs the target eNB may admit, aggregated additional bandwidth the target eNB may support, QCI information, etc. The indication of time in which the number of WTRUs may be accepted may be a rate indicating that a number N of WTRUs may be accepted in a time T ms.

Based at least on the information received in the handover response message 512, the source eNB 504 may perform a handover decision 512, in which it may decide to continue with the original group WTRU handover with all WTRUs, reduce the scope of the group of WTRUs or decide to attempt to hand the group over to another eNB, if available.

By way of example, the handover indication 510 and response 512 may be sent via new messages sent over the X2 interface and may be sent, for example, prior to the source eNB sending the X2 handover request message. By way of another example (not illustrated in FIG. 5), the handover indication 510 and response 512 may be sent over the S1 interface to the MME involved with handover, for example, in the transparent source to target container, such that the handover indication 510 may then be forwarded from the MME to the target eNB.

Figure 6:
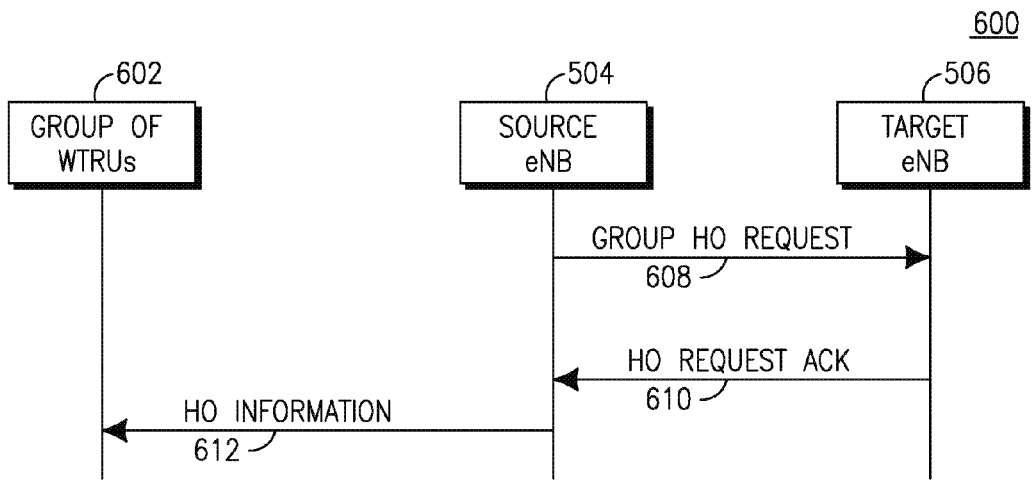
FIG. 6 is a diagram of a variation of the example group handover preparation phase of FIG. 5.

FIG. 6 is a diagram of a variation of the example group handover preparation phase of FIG. 5. As described with respect to FIG. 2, as part of the handover preparation phase 280, the source eNB 204 may send a separate X2 handover request message to the target eNB 206 for each WTRU. In the example illustrated in FIG. 6, a group of WTRUs 602 will be handed over to the same target cell corresponding to a particular target eNB. Here, the source eNB may consolidate and send all of the required information, including, for example, the WTRU-specific information for each WTRU in the group, in a single group handover request message 608 (e.g., an X2 message). In an embodiment, the handover indication message 510 described above with respect to FIG. 5 may be included in the group handover request message 608. The combined message may provide the target e-NB with sufficient information for admission control of all the WTRUs within the group. In an embodiment (not shown), the group handover request message 608 may be an S1 message.

In response to receiving the group handover request message 608, the target eNB 506 may send a handover request acknowledgement message 610 (e.g., an X2 message) to the source eNB 504. The handover request acknowledgement message 610 may include all required information for all WTRUs in the group that are part of the handover procedure in a single message. Additionally, the target eNB 506 may provide a list of WTRU C-RNTIs for those WTRUs that may not have been admitted.

In an embodiment, a transparent RRC container part of the message may hold the RRC message that is sent to the WTRU via the eNB. In this embodiment, the target eNB 506 may include one or more of the following: an RRC message that contains information that may be used commonly by all of the WTRUs in the group, an RRC message that contains information specific to the WTRU, and an RRC message that contains all information (both common and WTRU-specific) for all of the WTRUs in the group. For example, the target eNB 506 may include in the transparent container one instance of the RRC information that may be used commonly by all of the WTRUs in the group and a set of RRC messages that contain information specific to individual WTRUs in the group. For another example, the transparent container may include an RRC message that includes all information (both common and WTRU-specific) for all of the WTRUs in the group.

In an embodiment, the target eNB 506 may send all of the information required for the handover of the group of WTRUs as an X2 message without any transparent RRC container. Here, the source eNB 504 may process the information from the X2 message and construct the appropriate RRC messages for the WTRUs.

The source eNB 504 may receive the group handover request acknowledgement message 610 and send the received handover information to the group of WTRUs 602 (612). In an embodiment, the received handover information may be sent to the group of WTRUs 602 via a common information RRC message on the PDCCH. The message may be repeated every subframe or every fixed number of subframes (e.g., for a pre-determined duration of time to ensure that all of the WTRUs receive the information). The group RNTI transmission scheduling information may be provided to the WTRU at the time the WTRU joins the group, and may be informed of the group RNTI value. Alternatively, a new channel (e.g., a "group common channel") may be defined to transport the common information of the RRC handover command to the group of WTRUs. In another embodiment, the received handover information may be sent to the group of WTRUs 602 via WTRU-specific RRC messages sent individually to the WTRUs in the group 602 by using the WTRU C-RNTI on the PDCCH. Alternatively, the source eNB 504 may consolidate a set of WTRU-specific RRC messages and send them to the WTRUs using a group RNTI on the PDCCH. In another embodiment, all of the received handover information may be sent to the group of WTRUs 602 via an RRC message using the group RNTI on the PDCCH. For transmissions using group RNTI, a HARQ-ACK response message (not shown) from the WTRUs may not be required.

For example, the WTRUs in the group may first receive the dedicated information via individual WTRU-specific RRC messages using the WTRU C-RNTI on the PDCCH. This may trigger the WTRU to look for the next RRC signaling for common information by looking for the group RNTI in the PDCCH. For another example, the WTRU may look for the group RNTI every subframe independently of any handover related RRC message that the WTRU may receive. Since the common information transmission may be repeated for a certain period of time, the WTRU may have several opportunities to properly retrieve the common information. Once both the common information and the dedicated information have been received, the WTRU may start the synchronization procedure to the target cell (e.g., based on the received information).

In an embodiment where the WTRUs in the group receive all of the handover information via an RRC message sent to the group using the group RNTI on the PDCCH, the common information may be sent, for example, at the beginning of the signaling data, followed sequentially by the dedicated information for each individual WTRU in the group. In order for the WTRU to retrieve the common information, along with the dedicated information that belongs to itself from the entire signaled data, the source eNB 504 may include indexing information for the common information part and for each WTRU dedicated information part.

For example, before the common information part in the signaled data, the source eNB may indicate the length of the common information part, the number of WTRUs that are being signaled, and a list including the C-RNTI followed by a start and end byte index, which may represent the part of the signaled data that belongs to the WTRU with the indicated C-RNTI. For another example, the common information part may be of fixed length, and the indexing information for the common part may not be indicated.

In an embodiment, certain WTRU-specific information may be grouped within the signaled data such that further signaling efficiencies may be achieved. For example, the C-RNTIs allocated in the target cell for each WTRU may be sequential (e.g., the first WTRU may be allocated a C-RNTI value of n (e.g., 100), the second n+1 (e.g., 101), the third n+2 (e.g., 102), and so forth). This may be signaled to the WTRU in the signaled data as a single C-RNTI starting value, and the WTRU may derive its allocated C-RNTI by taking that starting value C-RNTI, and using its previously identified or signaled index or offset within the group, or by finding its own position in the ordered list, as provided in the previous example, and using that as an offset from the start value C-RNTI to determine its own allocated C-RNTI in the target cell.

In order to maintain security and integrity of each WTRU dedicated information part in the signaled data, each WTRU dedicated information part may be ciphered and integrity protected according to a WTRU-specific ciphering and integrity protection key used in coordination with the source eNB.

As described briefly above, a new channel may be defined for DL transmission of handover-related information or other relevant group configuration information that is common to all WTRUs belonging to a particular group. This information may also be available in the system broadcast information of the target cell. Examples of information that may be transported on this channel may include the PCI for the target cell for handover, the carrier frequency of the target cell for handover and/or the radio resource configuration common information. Additional information aside from handover command information that may be transmitted on this channel may include RACH and UL timing related information (e.g., described in more detail below), changed related to WTRU group configuration or the group common channel and measurement configurations for the group.

Figure 7:
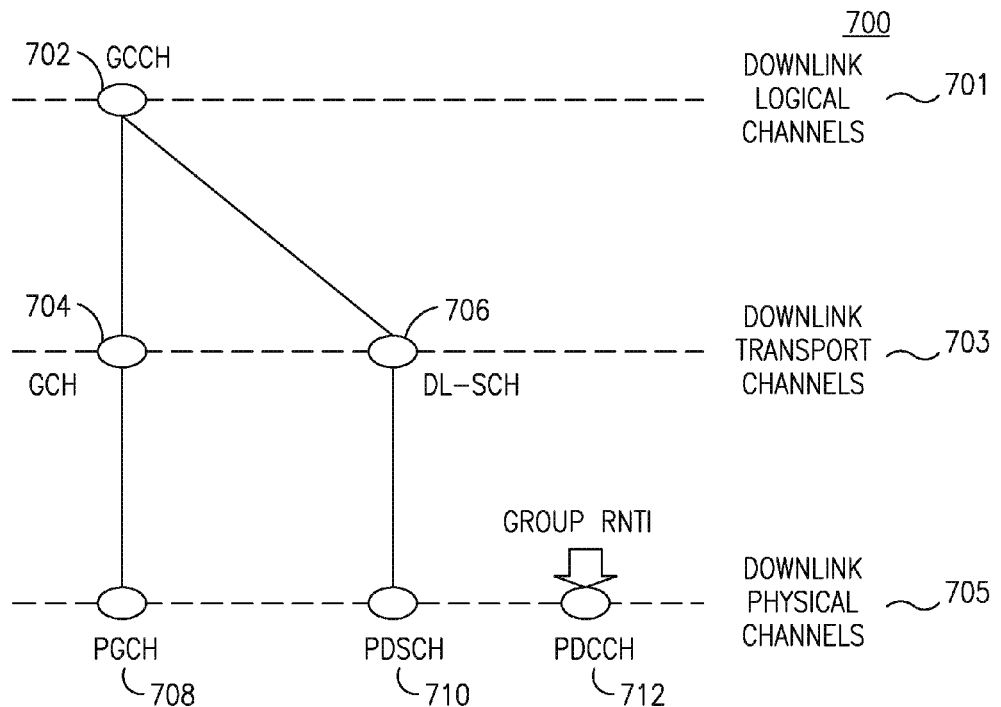
FIG. 7 is a diagram of an example mapping between logical, transport and physical channels for the group common channel.

FIG. 7 is a diagram 700 of an example mapping between downlink logical channels 701, downlink transport channels 703 and downlink physical channels 705 for the group common channel.

The group common control channel (GCCH) 702 (logical channel) may map common RRC handover information destined for the group of WTRUs into the RLC layer. The GCCH 702 may operate in transparent mode, without ARQ processing and without the WTRU peer entity acknowledging reception of the common channel information. In an embodiment, the GCCH 702 may operate with RLC unacknowledged mode to segment and concatenate larger RRC messages in the RLC layer. Similar to BCCH, there may be no PDCP involvement and, as such, security, such as integrity protection and ciphering, may not be applied to data of the GCCH 702.

At least one of the downlink transport channels 703 (MAC layer), including the group common channel (GCH) 704 and the DL-SCH layer 706 GCCH logical channel, may transport GCCH logical channel data. In the MAC layer, GCCH may map into the GCH 704. With respect to the GCH 704, it may perform transport layer multiplexing/de-multiplexing of multiple GCCHs for different WTRU group common information data, as well as prioritization. There may be no HARQ procedure associated with the GCH 704. With respect to the DL-SCH 706, in an embodiment, GCCH may be mapped into the DL-SCH 706 for transmission over an existing PDSCH/PDCCH. To indicate the allocation of resources for the group common channel on the PDSCH to the group of WTRUs, the PDCCH information may be associated with the group RNTI value or G-RNTI, as provided to the WTRUs upon entering a WTRU group.

Downlink physical channels 705 may include a PGCH 708, a PDSCH 710 and a PDCCH 712. The PGCH 708 may periodically transmit group common information in the same resource, both in the time domain and the frequency domain. The WTRU may be configured with the exact resource location and time as well as periodicity upon entering the WTRU group.

The scheduling of group common information data may be periodic and may be repeated continuously where the WTRUs in the WTRU group may continuously monitor and read the GCH after entering the group. In an embodiment, the data for the group channel information may also be on-demand as needed for when a group handover is triggered for a group of WTRUs. For the on-demand embodiment, the trigger to read the group common information on the PGCH 708 may be triggered by a reception of the abbreviated RRC reconfiguration message for handover with dedicated WTRU-specific information. The RRC reconfiguration message, in this case, may also include information needed for the WTRUs to reach the GCH 704, for example.

In another embodiment, the group common information may be scheduled on-demand, via PDCCH 712/PDSCH 710 with G-RNTI 714. The WTRUs in the group may continuously monitor the PDCCH 712 for the specific G-RNTI 714. Detection of the G-RNTI 714 may indicate an initiation trigger for group handovers to each WTRU and for each WTRU to expect a dedicated RRC message for handover.

As described above with respect to the PRACH procedures in FIGS. 2-4, the source eNB broadcasts information (234) including a PRACH resource configuration message. According to the procedure of FIG. 2 for handover of individual WTRUs, the PRACH resource configuration message is optimized for a nominal cell load, typical WTRU handover and/or typical WTRU arrivals profile. Such configuration may not, however, be able to accommodate the scenario where a large number of PRACH accesses are requested in a short period of time (e.g., due to lack of available PRACH resources). Accordingly, embodiments described below may provide for a temporary increase in PRACH resources and/or a reduction in the number of PRACH requests to a subset of the group of WTRUs.

Figure 8:
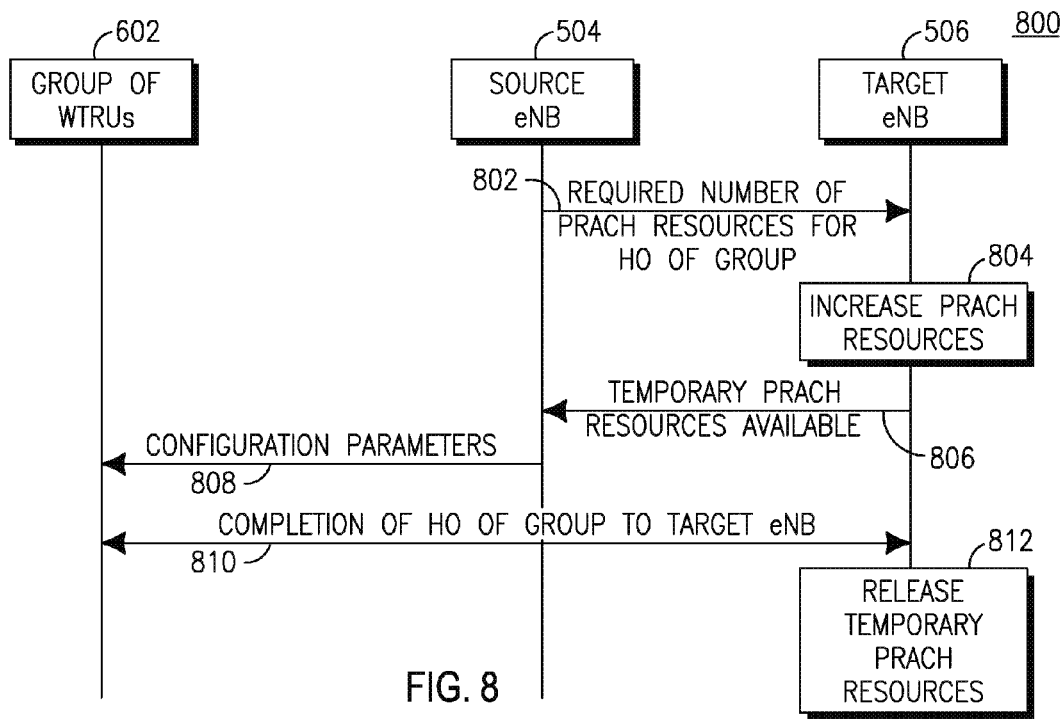
FIG. 8 is a diagram of a PRACH procedure wherein PRACH resources are increased.

FIG. 8 is a diagram of a PRACH procedure 800 wherein PRACH resources are temporarily increased to accommodate handover of a group of WTRUs. In the illustrated example, the source eNB 504 informs the target eNB 506 of the number of PRACH resources required to handover the WTRUs in the group 602 (e.g., the actual number of WTRUs in the group) (802). The target eNB 506 may increase its PRACH resources based on the information received from the source eNB 504 (804). The target eNB 506 may inform the source eNB 504 (or in an embodiment not shown, the WTRUs in the group 602 themselves) of the temporary PRACH resources available to all or a subset of the WTRUs in the group (e.g., only the WTRUs in the group 602) (806). The target eNB 506 may also provide the source eNB 504 (or the WTRUs themselves) with additional information regarding how to configure and use the temporary PRACH resources. For example the target eNB 506 may indicate to the source eNB 504 the maximum handover rate that it can support.

The source eNB 504 may inform the WTRUs in the group 602 of the configuration parameters of the dedicated PRACH resources provided by the target eNB 506 (808). Once the handover of the WTRUs in the group 602 is completed (810), the target eNB 506 may release the additional PRACH resources (812).

The PRACH resources may be increased (804) according to any one of a number of different methods. In an embodiment, the number of PRACH resources per subframe may be increased. For example, in FDD, the maximum number of PRACH resources per subframe may be increased to more than one resource. By doing so, the target eNB 506 may provision more PRACH resources in the subframes that are already configured for PRACH and may signal the format and/or location of these subframes and/or PRACH resources to the source eNB 504 (which may ultimately transfer such information to the WTRUs). For example, PRACH configuration parameters for TDD, which allow more than one PRACH resource per subframe, may be used for FDD.

In another embodiment, the number of subframes with PRACH resources may be increased. In addition to the subframes with PRACH resources originally configured and communicated to all WTRUs, the target eNB 506 may allocate more subframes with PRACH resources. By doing so, the target eNB 506 may provision more subframes with PRACH resources and may signal the format and/or location of these subframes to the source eNB 504 (which may ultimately transfer such information to the WTRUs).

In another embodiment, the number of PRACH resources within an existing LTE framework may be increased. The number of PRACH resources may be increased and signaled to all WTRUs within the existing LTE framework. By doing so, the target eNB 506 may provision more PRACH resources by changing the PRACH configuration parameters, such as a PRACH-ConfigurationIndex, PRACH-FrequencyOffset, ra-PreambleIndex and ra-PRACH-MaskIndex, and broadcast this new configuration to the WTRUs.

For the embodiments where either the number of PRACH resources per subframe are increased or the number of subframes with PRACH resources are increased, the temporary increase in PRACH resources may be signaled to the source eNB 504 (or directly to the WTRUs) in any one of a number of different formats. For example, the total number of PRACH resources may be indicated. Here, the target eNB 506 may combine the temporary PRACH resources and its long-term PRACH resources into one set of resources for the purpose of signaling them to the source eNB 504 and the designated WTRUs in the group 602. One example of this may be when some or all of the PRACH configuration parameters communicated to the source eNB 504 and/or designated WTRU, such as PRACH-ConfigurationIndex, PRACH-FrequencyOffset, ra-PreambleIndex and ra-PRACH-MaskIndex, are configured considering the total available resources (e.g., including both long-term and temporary resources). The long-term PRACH resources may be those for which the configuration is broadcast in the cell. The temporary PRACH resources may be those that may be used for a specific purpose, such as access for handover completion, and then not used anymore.

For another example, two individual sets of resources may be indicated. Here, the target eNB 506 may still signal the long-term PRACH resources to the source eNB 504 (and optionally the designated WTRUs) using the existing configuration parameters of PRACH, such as PRACH-ConfigurationIndex, PRACH-FrequencyOffset, ra-PreambleIndex and ra-PRACH-MaskIndex. However, the target eNB 506 may also signal the extra temporary resources using additional signaling. For example, the target eNB 506 may use another set of configuration parameters, duplicating some or all of the long-term PRACH configuration parameters and renaming them, such as Extra-PRACH-ConfigurationIndex, Extra-PRACH-FrequencyOffset, Extra-ra-PreambleIndex and Extra-ra-PRACH-MaskIndex, such that they only indicate the configuration for the temporary resources. The designated WTRUs may be configured to have access to only the extra resources or a combination of the extra and long-term resources. The long-term PRACH resources may be those for which the configuration is broadcast in the cell. The temporary or extra PRACH resources may be those that may be used for a specific purpose, such as access for handover completion, and then not used anymore.

Using any of the above signaling formats, the designated WTRUs may receive another parameter indicating that the configuration set, or part of the configuration set such as the temporary or extra resources, may be valid only for a certain period of time or number of attempts and, once expired, the WTRU may not use all or part of this configuration set. Alternatively, using any of the above signaling formats, the designated WTRUs may be notified that the temporary or extra PRACH resources may only be used for the designated purpose (e.g., handover completion in the target cell), and once that is completed (or failed), the WTRU may not use all or part of the configuration set received.

In an embodiment, the increased PRACH resources may be allocated using any of the following considerations. For example, the increased PRACH resources may only be available to the WTRUs in the same group. For another example, the WTRUs in the same group may use other PRACH resources (e.g., PRACH resources that are available to other WTRUs). For another example, the increased PRACH resources may be configured for only contention-based RACH, only contention-free RACH, or for any combination of random access methods. One result may be that the WTRU may receive PRACH resources that differ from the ones broadcast by the target cell.

In another embodiment, the RACH process may be initiated by a subset of the WTRUs in the same group, and then some or all of the measurements and/or configuration parameters of those RACH processes (e.g., timing advance parameters and UL power control parameters) may also be applied to other WTRUs in that group (e.g., "non-RACH WTRUs"). By doing so, some or all RACH steps for a subset of the WTRUs in that group may be skipped and, therefore, a smaller number of PRACH resources may be required during the handover of the WTRUs in the group.

As part of an LTE R10 RACH procedure, in addition to the TA value, certain power control parameters for transmitting the UL RACH msg3 on the PUSCH are either derived or provided to the WTRU. For example, the total power ramp-up from the first to last preamble ($\Delta P_{rampup}$) that is derived by the WTRU based on preamble transmission and retransmission until random access response (RAR) is received from the eNB. TPC command ($\delta_{msg2}$) that is provided in the UL grant portion of the random access response from the eNB.

In embodiments of the RACH procedure described herein, the $\Delta P_{rampup}$ and the $\delta_{msg2}$ parameters may be used by non-RACH WTRUs in the WTRU group to properly perform power control during the initial UL transmission to the network to indicate to the target eNB of the handover procedure completion. This may be obtained by one, or a combination, of the following. The target eNB may transmit, and the WTRU may read, the $\Delta P_{rampup}$ and the $\delta_{msg2}$ parameters upon moving to the target eNB in the group common channel as broadcasted information to the WTRU group. The eNB may include the UL TPC command and the information for total power ramp up, along with possibly the timing advance information. In an embodiment, the power ramp-up value may be the averaged power ramp-up value that was used by each RACH WTRU as part of the successful RACH procedure. In another embodiment, the power ramp-up value may be the average number of preamble retransmission RACH WTRUs transmitted. Given the power step value provided as part of the RACH configuration to each WTRU, the non-RACH WTRUs may be able to derive the total power ramp-up value based on the number of preamble retransmission. The non-RACH WTRU may, by reading the group common information on the target cell, have acquired the proper DL timing reference to synchronize with the target cell without RACH. In another embodiment, these values may also be included in the UL grant that each non-RACH WTRU receives in order to complete the WTRU handover.

In an example embodiment, a source eNB may communicate with the target eNB and may initiate the handover of a subset of the WTRUs in the group (also referred to herein as selected WTRUs). For example, ten percent of the WTRUs in the group, or special WTRUs or WTRU-like devices, may act for the group in conducting a RACH procedure with the target eNB using, for example, contention-free or contention-based random access. The target eNB may evaluate the timing advance for the selected WTRUs and may respond to requests for RACH resources initiated by the selected WTRUs.

For example, a WTRU in the group that has been designated for group RACH may be provided with dedicated RACH information in the RRC reconfiguration message for the handover procedure. In an embodiment, it may be provided with an indication to perform RACH, for example, based on its group ID of the WTRU within the group, and then without any dedicated RACH information, perform a contention-based RACH procedure. In another embodiment, the RACH WTRU may further be provided with some type of back off timer to indicate a duration of time for which the WTRU should wait before initiating the RACH procedure such that collisions of preamble attempts are minimized at the target eNB.

The notion of the timing advance of the selected WTRUs (e.g., the average of timing advance values), may be communicated to non-selected WTRUs in the group in any one of a number of different ways. In an embodiment, the non-selected WTRUs may monitor the timing advance responses sent from the target eNB to the selected WTRUs and use the same timing advance values. In this embodiment, non-selected WTRUs may need additional information from the source/target eNB to complete the monitoring process. In another embodiment, the target eNB may broadcast the timing advance value to the non-selected WTRUs.

For example, such information may be transmitted in the downlink channels (e.g., PDSCH and PDCCH) of the target eNB or, in an embodiment, be sent using the group common channel to broadcast the information to the group of WTRUs. In another embodiment, the source eNB may receive the timing advance information from the target eNB and then communicate the information to the non-selected WTRUs.

The source eNB may configure the non-selected WTRUs to switch to the target eNB at a particular time. The switching instant might be communicated to the target eNB by the source eNB in advance. In another embodiment, the source eNB may configure the non-selected WTRUs to switch as soon as possible or, if the request to switch was in subframe n, for example, to switch in subframe n+k (where n+k is known or configured). After configuring the WTRUs, the source eNB may inform the target eNB.

After the switching instant, or sometime after the target eNB is informed by the source eNB of the impending switch such that the target eNB expects the WTRUs to have switched, the target eNB may request an uplink transmission from the non-selected WTRUs to confirm their handover. The WTRU may use the timing and power control parameters, as detailed above, for its first UL transmission to the target cell. From the perspective of a non-selected WTRU, if the WTRU does not receive an uplink grant in a certain time frame after switching to the target eNB, the WTRU may assume that handover has failed and may return to the source cell and report the failure. In an embodiment, in case of failure to receive a UL grant or failure to receive an acknowledgement for RRC reconfiguration complete, the WTRU may attempt to re-establish synchronization by means of a contention-free RACH procedure, if dedicated RACH information has been provided to the WTRU (otherwise, by means of a contention-based random access procedure). From the perspective of a non-RACH selected WTRU and target eNB, upon receiving an uplink grant on the PDCCH and successfully transmitting uplink data, (e.g., RRC Reconfiguration Complete), the WTRU may indicate that handover has been successfully completed.

As described above with respect to the handover completion phase 284 of FIG. 2, handover completion includes procedures between a source eNB, a target eNB and the EPC to complete the switching of one or more WTRUs from a source cell to a target cell in terms of the data path. Once switching of the data paths has been completed, resources and WTRU contexts may be released from the source eNB. For group handover, the signaling involved in path switching and resource release may be bundled into a single message for all WTRUs involved in the group handover. For example, an S1 Path Switch Request from a target eNB to an MME may include E-RAB information for which the data path needs to be switched, along with the associated information. A list of E-RABs associated with all WTRUs that are served by the same MME may be consolidated into a single Path Switch Request message as a group. This way, the target eNB may send a request message for each separate MME by which the WTRUs in the group are served. For another example, the same principle may be applied to S1 Path Switch Request Acknowledgement and X2 WTRU Context Release message, which may also be part of the handover completion phase.

From a data plane perspective, data forwarding may occur between the source eNB and the target eNB to minimize data loss for the WTRU during handover. In Rel-10, there is a data forwarding X2 path for each E-RAB that is active for the WTRU. For group handover, the X2 data path for data forwarding may be consolidated such that a group of E-RABs may be forwarded on an X2 data path. This grouping may include, for example, grouping by QoS parameters (e.g., E-RABs with similar QoS characteristics (e.g. QCI, GBR, AMBR)), grouping by WTRU (e.g., each WTRU is provided with one X2 data path) and grouping by group of WTRUs (e.g., the entire group, or a subset of the group, being handed over may be allocated one X2 data path). Multiplexing of the data path may be done prior to transport over the GTP-U layer.

One WTRU, or a subset of WTRUs, in a group may be designated as the representatives of the group such that reports or messages from such WTRUs may be viewed as reports or messages from all of the WTRUs in the group. The other WTRUs may be told not to make certain reports or send certain messages. Special WTRUs or WTRU-like devices may be used as the representatives, such as ones that may be provided (e.g, fixed devices) in one or more cars of a train for this purpose.

For example, to reduce the signaling to the network for tracking area update (TAU) tracking area update as the WTRUs move together and change tracking areas, a designated WTRU or WTRUs for a group may report the TAU for the group. The TAU from these designated WTRUs may include an indication of the group. Alternatively, the network entity receiving the TAU may have received the linkage between these WTRUs' reports and the identity of the group and/or the identities of the WTRUs in the group for which this TAU applies from another source such as the entity (e.g, the eNB) that grouped the WTRUs.

A WTRU that supports carrier aggregation (CA) may be capable of transmitting and receiving on more than one serving cell simultaneously. In an embodiment, these serving cells may belong to the same eNB. If this capability is extended such that the WTRU may communicate with cells from different eNBs, fast handover may be facilitated.

Since the WTRU may be capable of handling primary and secondary cells, a cell belonging to a different eNB may be considered a special type of Scell. A WTRU may receive the necessary information about a cell of another eNB such that it may make measurements on it, may synchronize to it and may receive its broadcast channel. The WTRU may also be able to read any downlink messages that are intended for a group or any dedicated messages if an RNTI was provided to it by the source eNB (e.g., via one of the WTRU's regular serving cells). These downlink messages may be considered best effort and may not require HARQ or other uplink feedback from the WTRU. In this way, the WTRU may obtain target information in advance of handover without the source eNB having to forward such information.

A WTRU may report to the source eNB when it has synchronized with another cell, has good measurements from the serving cell, and/or has read the broadcast channel of the serving cell. A WTRU may be able to perform a RACH access in the target cell while still connected to the source cell and before (possibly long before) beginning handover to that cell. A WTRU may be able to receive a timing advance from the target cell or on the downlink of the source cell, in an embodiment in response to the RACH access in the target cell, which may be made using dedicated resources. A WTRU may make a RACH access in the target cell and receive any response in the source cell. A WTRU may make a RACH access in the target cell and send an RRC connection setup request indicating a cause for an advance handover preparation so that the target cell may prepare in advance for the WTRU's arrival. A WTRU may autonomously determine when it is ready to handover, for example, based on measurements, its ability to obtain system information in the target cell, and/or whether it received a response to a RACH access it performed in the target cell. A WTRU may indicate to the source cell or the target cell when it is ready to handover. Response may be a normal or modified handover procedure, for example, with greatly reduced signaling since the WTRU may have obtained much of the information it needs itself.

As described above, WTRUs may be grouped for the purpose of mobility management. In an embodiment, the eNB may use some means to determine which WTRUs belong to a particular group (for example, the eNB may use neighbor cell measurement reports and/or other information available to it such as WTRU positioning information). In addition, a WTRU that is part of a group may share a common identity with other WTRUs in the group or may be identified by a specific group identity. Further, the group may be configured by the network, and RRC messages may be sent to the group that all WTRUs in the group should read and act upon.

For the purpose of enabling WTUs to know the group they are in and how to act, at least one of the following may apply. In an embodiment, a WTRU may receive an explicit indication that it is in a group, which may be one or more of a group ID and one or more group RNTIs. In another embodiment, a WTRU may use a group RNTI for reception of messages related to one or more of measurement control, handover control, and reception of target (or other) cell broadcast information provided to the WTRU by the source cell. In another embodiment, the same group RNTI or different group RNTIs may be used for the different types of messages. In an embodiment, a WTRU may receive information regarding when to expect the group RNTI, such as in what subframes or pattern of subframes. In an embodiment, a WTRU may receive a WTRU-specific identifier, for example an index or offset, which may provide its unique identity within a group and/or which may be used to derive WTRU-specific information from group information. One or more of the group indications, IDs, and RNTIs may be received by the WTRU from an eNB where that eNB may be its serving eNB.

One or more of the indications, IDs, and RNTIs may be received by the WTRU from a cell that is its serving cell, one of its serving cells, a cell it is camped on, or another cell. One or more of the group indications, IDs, RNTIs, and/or WTRU-specific identifiers within the group may be received by the WTRU from another device (for example, one to which it is in proximity of or one to which it is connected to, for example, any such device that is capable of providing any such indication(s), ID(s), RNTI(s) and such reception) via any suitable interface (e.g., an LTE or other cellular-type interface, WLAN, Bluetooth, and the like).

For example, the grouping of WTRUs may be determined when a passenger boarding a train or entering a station uses near field technology and swipes his or her electronic ticket on the WTRU at the station entrance to gain entry and access to the train. The group to which the WTRU may belong may be determined by the train indicated on the ticket and, in an embodiment, further by the train car and seat number if the ticket is for a reserved seat. The group information obtained by the near field technology may be used by the WTRU autonomously for the purpose of group related procedures, or the information may be provided to the network in the form of a measurement report or during connection establishment procedures, such that the network may use that information to explicitly allocate the WTRU to a particular WTRU group.

A WTRU may determine its group and/or WTRU-specific identifier based on information obtained from another device (e.g., one to which it is in the proximity of or one to which it is connected), where such information may be obtained via any suitable interface, which may include an LTE or other cellular-type interface, WLAN, Bluetooth, and the like. A WTRU may provide one or more group related indicators, which may include a WTRU-specific indicator within a group, to one or more of its serving cell, primary serving cell, serving eNB, target cell, target primary serving cell, target eNB or, other device via the appropriate interface.

A WTRU may leave or be removed from a group. An indication to a WTRU that it is no longer in a group may include at least one of a WTRU receiving an explicit indication that it is no longer in a particular group or group and/or a WTRU receiving a reconfiguration indicating that a previously configured group ID, which may be a mobility group ID or group RNTI, no longer applies to the WTRU.

A WTRU may indicate when it leaves a group, when its group changes, when it no longer belongs to any group, or when one or more of its group related indicators changes or is no longer valid. A WTRU may indicate this to one or more of its serving cell, primary serving cell, serving eNB, target cell, target primary serving cell, target eNB, or other device via the appropriate interface. When a WTRU has left or been removed from a group, the WTRU may no longer look for messages intended for that group or act in accordance with any instructions received for that group.

In an embodiment, a WTRU may receive an indication of addition and removal from a group in the form of group IDs or group RNTI, as part of the WTRU mobility procedure. For example, in connected mode, the WTRU may be indicated in RRC Reconfiguration with Mobility Control Info message upon handover that it is being removed from a group and being added to another group, as indicated in the message. Additionally, for IDLE mode mobility, a WTRU may receive information of group in an RRC Connection Release message, as part of its re-direction information to another cell, as part of the WTRU cell selection procedure. In both instances, whether in connected or IDLE mode, the WTRU may, as part of its mobility procedure, also receive information about the new WTRU group it has been added to, such as the new group RNTI and/or group ID, measurement related information, or configuration information about reading the group common information (GCH).

Based on the group ID or group RNTI, a WTRU may look for messages intended for the group, such as physical layer messages or RRC messages. Looking for such messages may include one or more of monitoring the PDCCH, reading the PDSCH, decoding MAC layer messages (such as MAC CE), and decoding RRC layer messages. Based on the group ID or group RNTI, a WTRU may also read the PDCCH of its serving cell (or one of its serving cells in the case of CA), and use the group RNTI to determine if the PDDCH is intended for that WTRU group and, if so, respond accordingly based on the content of the PDCCH. For example, the group RNTI may be used to read the GCH, as described above. Based on the group ID or group RNTI, a WTRU may look for messages intended for the group in certain subframes based on configuration information received which identified when to look for these messages. Based on the group ID or group RNTI, a WTRU may look for messages intended for the group after the occurrence of an event such as change of best cell. Based on the group ID or group RNTI, a WTRU may also respond in accordance with a message received for the group.

Based on a WTRU-specific identifier within a group, a certain WTRU may use the identifier (e.g., index) to locate any WTRU-specific information intended for that certain WTRU when receiving a message or other information intended for its group. Based on the WTRU-specific identifier within a group, a certain WTRU may also use the identifier (e.g., index) to derive one or more parameters for that certain WTRU based on one or more base parameters received for the group. For example, the WTRU may receive a base preamble to use for RACH access in a target cell for handover, and the WTRU may derive its preamble from that base preamble using its WTRU-specific identifier in the group, possibly using the identifier as an index offset, which may be added to the base preamble index provided. For another example, the WTRU may receive a base C-RNTI to use in a target cell when handing over its C-RNTI from that base C-RNTI using its WTRU-specific identifier in the group, possibly using the identifier as an offset, which may be added to the base C-RNTI provided. For another example, the WTRU may receive a set of WTRU-specific information in the group message, and it may use the identifier to find the information that is intended for that WTRU.

As described above, a WTRU may explicitly receive group indications, IDs, RNTIs, and/or one or more WTRU specific identifiers within the group, or the WTRU may obtain these from information received or from another device that is capable of providing any of these. The device may be one that broadcasts in some way group information, such as a group indicator or the group RNTI for all WTRUs in its proximity. Alternatively, the device may be one that can communicate to individual WTRUs and provide WTRU-specific information related to the group. Communication with the WTRU may be via any suitable interface, which may include an LTE or other cellular-type interface, WLAN, Bluetooth, and the like. The device may have WTRU or WTRU-like capabilities and may be able to communicate with the same cell(s) as the WTRUs near it or connected to it. The device may be able to provide group information to the same cell(s) as the WTRUs near it, or connected to it, which may assist the eNBs in determining how to group the WTRUs. For the train example, one such device may be provided for a whole train, each car of the train, or for each subset of train cars.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A first long term evolution (LTE) wireless transmit/receive unit (WTRU) comprising:

a transceiver configured to receive from a second LTE WTRU a group identifier associated with a group of WTRUs in proximity to the second LTE WTRU;
the transceiver further configured to receive configuration information indicating subframes in which to monitor at least one LTE physical channel to determine whether messages have the group identifier;
the transceiver further configured to monitor the at least one LTE physical channel for messages with the group identifier in the indicated subframes; and
the transceiver further configured to receive a message with the group identifier over the at least one LTE physical channel, wherein the received message is associated with the group, and wherein the at least one LTE physical channel is not an LTE physical downlink shared channel (PDSCH) and is not an LTE physical downlink control channel (PDCCH).

2. The first LTE WTRU of claim 1, wherein the configuration information is received from an evolved Node B (eNB).

3. A first long term evolution (LTE) wireless transmit/receive unit (WTRU) comprising:
a transceiver configured to receive configuration information indicating subframes for transmission on at least one LTE physical channel, wherein the at least one LTE physical channel is not an LTE physical downlink shared channel (PDSCH) and is not an LTE physical downlink control channel (PDCCH);
the transceiver further configured to communicate using the at least one LTE physical channel, wherein messages sent over the at least one LTE physical channel intended for a group have a group identifier associated with the group; and
the transceiver further configured to transmit messages intended for the group with the group identifier on the at least one LTE physical channel in the indicated subframes.

4. The first LTE WTRU of claim 3, wherein the configuration information is received from an evolved Node B (eNB).

5. A method performed by a first long term evolution (LTE) wireless transmit/receive unit (WTRU), the method comprising:
receiving from a second LTE WTRU a group identifier associated with a group of WTRUs in proximity to the second LTE WTRU;
receiving configuration information indicating subframes in which to monitor at least one LTE physical channel to determine whether messages have the group identifier;
monitoring the at least one LTE physical channel for messages with the group identifier in the indicated subframes; and
receiving a message with the group identifier over the at least one LTE physical channel, wherein the received message is associated with the group, and wherein the at least one LTE physical channel is not an LTE physical downlink shared channel (PDSCH) and is not an LTE physical downlink control channel (PDCCH).

6. The method of claim 5, wherein the configuration information is received from an evolved Node B (eNB).

7. A method performed by a first long term evolution (LTE) wireless transmit/receive unit (WTRU), the method comprising:
receiving configuration information indicating subframes for transmission on at least one LTE physical channel, wherein the at least one LTE physical channel is not an LTE physical downlink shared channel (PDSCH) and is not an LTE physical downlink control channel (PDCCH);
communicating using the at least one LTE physical channel, wherein messages sent over the at least one LTE physical channel intended for a group have a group identifier associated with the group; and
transmitting messages intended for the group with the group identifier on the at least one LTE physical channel in the indicated subframes.

8. The method of claim 7, wherein the configuration information is received from an evolved Node B (eNB).

* * * * *